(12) United States Patent
Oliveti et al.

(10) Patent No.: US 7,588,472 B2
(45) Date of Patent: Sep. 15, 2009

(54) MODULAR APPARATUS AND METHOD FOR DATA COMMUNICATION BETWEEN A DISTRIBUTION NETWORK AND A RESIDENTIAL NETWORK

(75) Inventors: Guido Oliveti, Milan (IT); Francesco Simonelli, Milan (IT); Giovanni Tagliabue, Milan (IT)

(73) Assignee: Pirelli & C. S.p.A., Milan (IT)

( * ) Notice: Subject to any disclaimer, the term of this patent is extended or adjusted under 35 U.S.C. 154(b) by 490 days.

(21) Appl. No.: 10/538,875

(22) PCT Filed: Dec. 18, 2002

(86) PCT No.: PCT/EP02/14482

§ 371 (c)(1),
(2), (4) Date: Jan. 23, 2006

(87) PCT Pub. No.: WO2004/055949

PCT Pub. Date: Jul. 1, 2004

(65) Prior Publication Data

US 2008/0123669 A1    May 29, 2008

(51) Int. Cl.
*H05K 7/10* (2006.01)
(52) U.S. Cl. .................. 439/717; 439/928; 439/188
(58) Field of Classification Search .................. 439/717, 439/928, 188
See application file for complete search history.

(56) References Cited

U.S. PATENT DOCUMENTS

| | | | |
|---|---|---|---|
| 4,718,858 A | 1/1988 | Godfrey et al. | |
| 5,311,397 A * | 5/1994 | Harshberger et al. | ........ 361/683 |
| 5,959,992 A | 9/1999 | Benayoun et al. | |
| 6,537,109 B1 * | 3/2003 | Emery | ........................ 439/638 |
| 6,802,737 B2 * | 10/2004 | Bergner et al. | .............. 439/532 |
| 2001/0030855 A1 | 10/2001 | Green et al. | |
| 2002/0065935 A1 | 5/2002 | Koperda et al. | |

* cited by examiner

*Primary Examiner*—Gary F. Paumen
(74) *Attorney, Agent, or Firm*—Finnegan, Henderson, Farabow, Garrett & Dunner, L.L.P.

(57) ABSTRACT

A modular apparatus for data communication between a distribution network and a residential network is disclosed. The apparatus has a first device adapted to interface a distribution network, at least one second device adapted to interface a residential network and to be mechanically and electrically connected to the first device, and at least one interconnecting lock adapted to keep the first device and the at least one second device firmly secured to each other and to activate electrical supply between the first device and the at least one second device.

12 Claims, 3 Drawing Sheets

MODULAR APPARATUS AND METHOD FOR DATA COMMUNICATION BETWEEN A DISTRIBUTION NETWORK AND A RESIDENTIAL NETWORK

CROSS REFERENCE TO RELATED APPLICATION

This application is a national phase application based on PCT/EP2002/014482, filed Dec. 18, 2002, the content of which is incorporated herein by reference.

BACKGROUND OF THE INVENTION

1. Field of the Invention

The present invention relates to a modular apparatus and method for data communication between a distribution network and a residential network. More generally, the invention relates to a modular apparatus and method for allowing bi-directional data communication between a plurality of heterogeneous communication networks, and a local communication network allowing to interconnect residential appliances comprising a modular apparatus as above defined.

2. Description of the Related Art

Throughout the following description and the subsequent claims, the term "data" will be used to generally indicate those information or signals which are typically transmitted over a network, such as computer data, voice and video signals, etc. The term "distribution network" will be used to generally indicate a network adapted to transfer data to one or more narrower network, whereas the term "residential network" will be used to indicate a network adapted to receive data from a wider network and to transfer these data, directly or by interposition of narrower local networks, to a plurality of appliances, such as computers, printers, faxes, photocopying machines, television sets, telephones, etc. In the preferred embodiments of this invention, the term "distribution network" will be used to indicate, preferably, a wide area network (WAN) or any other type of external or metropolitan network, whereas the term "residential network" will be used to indicate, preferably, a local area network (LAN) or any other type of in-home network (such as that or those of residential or business settings). Typically, and also in accordance with the present invention, the data communication between the distribution network and the residential network is bi-directional.

As known, bi-directional data communication between a wide area network (WAN) and one or more local area networks (LAN), which were once restricted to large business settings, is now required also in residential and/or medium-small business settings. In this respect, appropriate systems are needed within the residential or business settings to provide a bridging (or routing, or gateway) function between the external or wide area network and one or more in-home or local area networks, thus allowing data distribution to different kinds of residential or business appliances, such as computers, printers, faxes, photocopying machines, television sets, telephones, etc. It is very likely that this need will be always increasing in the future as new networking technologies will be discovered.

Some currently available gateway systems provide simultaneous access to multiple types of WANs or LANs using any of a variety of communication protocols. In some cases, these systems are modular systems which are capable of accepting additional modules as desired by the user, and the modules are capable of transferring data to and from other modules.

US patent application No. US 2002/0065935 A1 discloses a scalable modular gateway capable of communicating computer data, as well as voice and video services, between a variety of heterogeneous communication networks using any of a variety of communication protocols. The modular communication system includes at least two modules forming a stack. A first module interfaces a metropolitan distribution network (WAN) and a second module interfaces at least one residential network (LAN). Stacking pegs assist the proper alignment of the modules when stacked together. In the preferred embodiment, the modules communicate with each other using connectors which are mated when the modules are stacked together. Communications buses allow data communication between the modules.

SUMMARY OF THE INVENTION

The Applicant has realized that the current available gateways, as the one disclosed in the above identified patent application, suffers of some limitations and drawbacks. One of these is correlated to the possibility of damaging either the WAN or LAN or appliances connected thereto by permitting electrical and data communication between the modules even when these modules are not correctly and stably connected to each other, or by permitting the user to intentionally or accidentally interconnect modules which are not functionally fully compatible to each other, for example because they come from different manufactures. Another drawback is correlated to the possibility of transmitting corrupted or erroneous information, perturbing the WAN and/or LAN or temporarily making unavailable one of the services (such as telephony) linked to the LAN or the WAN.

The Applicant has realized that to ensure high performance of the gateway and avoiding that the same gateway be damaged by intention or accident, or even that the WAN or LAN or appliances connected to the gateway be damaged, it is highly advisable at first to achieve a stable and correct mechanical and electrical connection between the modules and secondly to activate the electrical supply between the modules only when this stable and correct mechanical and electrical connection is achieved. Data communication between the modules is enabled only after each module is electrically supplied.

In this respect, the Applicant has realized that the above objects can be achieved by using an interconnecting device which locks the modules to each other and activates the electrical supply (and, hence, enables data communication) between these modules.

Therefore, the present invention relates, in a first aspect thereof, to a modular apparatus for data communication between a distribution network and a residential network, comprising:
 a first device adapted to interface a distribution network;
 at least one second device adapted to interface a residential network and to be mechanically and electrically connected to said first device; characterized in that the apparatus further comprises at least one interconnecting device adapted to lock said first device and said at least one second device to each other and to activate electrical supply between said first device and said at least one second device.

Throughout the present description and the subsequent claims, interchangeable use of the terms "modular apparatus" and "modular gateway" will be done, as well as of the terms "device" and "module". In particular, interchangeable use of the term "first device" and "base module" will be done, as well as of the term "second device" and "first expansion module".

While the invention will be described in the following of the present description with explicit reference to a gateway, those skilled in the art will realize that the invention generally relates to any kind of apparatus which connect a distribution network and a residential network to each other, such as gateways, bridges, routers, etc.

Further, throughout the present description and the subsequent claims the expression "stable and correct mechanical and electrical connection" will be used to indicate a type of connection wherein the two modules, after having been mechanically and electrically connected to each other, cannot be disconnected by accident, but they are still disconnectable voluntarily without great efforts by the single operation of pulling or otherwise disengaging the two modules from each other.

Hence, the invention relates to a modular apparatus capable of allowing data communication between a variety of different networks connected thereto (for example between a WAN and a LAN) through a plurality of devices (modules). Advantageously, the apparatus of the invention allows achieving high performance of the communication system and avoiding damaging by intention or accident of the same apparatus, or even of the networks or appliances connected thereto, by accomplishing and keeping a stable and correct mechanical and electrical connection between the devices or modules. More advantageously, this is achieved by providing an interconnecting device or lock which carries out both the functions of locking these modules to each other once connected (thus achieving and keeping over the time a stable and correct mechanical and electrical connection between the modules) and activating the electrical supply between the modules only when these modules are locked to each other. Therefore, the interconnecting device of the apparatus of this invention prevents powering of the expansion modules and this prevents data communication between the modules when these are not stably and correctly connected to each other, thus preserving the same modules, the networks and the appliances from possible damages.

Preferably, said at least interconnecting device is adapted to mate with appropriate seats provided on said first and second devices, thus advantageously preventing the user from accidentally or voluntarily interconnecting modules which are not structurally and functionally fully compatible to each other and which therefore could cause the above mentioned damages (such as modules coming from different manufactures).

Preferably, the apparatus of the invention interfaces the WAN or external network through the first device (base module) by xDSL (e.g., ADSL) or optical technology. The base module receives the data from the WAN and routes these to different LANs or directly to different appliances through the other devices (expansion modules) of the apparatus.

Preferably, said first device also interfaces a local network so that, if only one module is needed to transmit data to the appliances of the residential setting, the apparatus consists of only the first device.

The modular design of the apparatus of the invention advantageously has a variable geometrical configuration capable of accepting additional modules as the customer requires and as new networking technologies are discovered. In other words, the apparatus of the invention is not a fixed-size apparatus and may grow in capability as the customer requires and as new communications technologies are created. The manufacturing cost of the apparatus is therefore somehow proportionate to the number of modules and type of in-home networks needed, that means a very low initial cost if only few modules are required to supply data to the residential appliances, such cost increasing only as new technologies evolve and new modules are required.

Preferably, said first and at least one second devices are mechanically and electrically connected to each other in a stack and said at least one interconnecting device is operatively interposed between said first and at least one second devices. Preferably, the stack is a vertical stack and connectors for electrical connection and data communication between the modules are provided along a vertical direction so that they do not project out of the gateway when the modules are stacked together. This configuration advantageously allows to achieve space-optimization and aesthetical value within the residential setting. However, even if less preferred, horizontal stack and other forms and shapes of module interconnection are also possible without affecting the operation and the main inventive aspects of the apparatus of this invention.

Preferably, said at least one interconnecting device defines a first operative configuration wherein said first and at least one second devices are unlocked so as to be disconnectable from each other and wherein the electrical supply (and, hence, data communication) between said modules is prevented, and a second operative configuration wherein said first and at least one second devices are locked so as to be not disconnectable from each other and wherein the electrical supply between said modules is activated. The user is thus advantageously prevented to connect/disconnect the modules to/from each other when electrical connection and data communication is occurring, thus avoiding to incur the risk of damages for the modules, the networks and the residential appliances.

More preferably, said at least one interconnecting device comprises a locking element which is mobile between a first operative position corresponding to said first operative configuration of the apparatus and a second operative position corresponding to said second operative configuration of the apparatus. Advantageously, the locking element allows to obtain and keep over the time the desired stable and correct mechanical and electrical connection between the modules, this being a prerequisite for allowing activation of the electrical connection and data communication between these modules.

Preferably, said at least one interconnecting device further comprises:
  a first seat for said locking element formed on said first device;
  a second seat for said locking element formed on said at least one second device;

wherein said second seat slidably houses said locking element and said first seat is adapted to house a free end of said locking element when said locking element is at said second operative position. Thus, according to a preferred embodiment of the apparatus of the present invention, the locking element is slidably associated with an appropriate seat of the expansion module, so that it cannot be easily lost by the user.

Preferably, the apparatus of the invention further comprises a pin integrally formed with said first device and a hole formed into said locking element, wherein said hole slidably houses said pin and comprises a narrower end portion adapted to cooperate with said pin when said locking element is at said second operative position, thus securing said first device to said locking element (and thus to the second device or expansion module).

Preferably, the apparatus of the present invention further comprises a switch adapted to be switched on by said locking element when said locking element is at said second operative position thus activating the electrical supply between said first and at least one second devices, and to be switched off by said locking element when said locking element is moved away from said second operative position thus deactivating the electrical supply (and, hence, data communication) between said first and at least one second devices. Advantageously, this switch allows, in combination with the sliding element, activation of the electrical supply between the modules only when these modules are locked to each other (that is, when the locking element is at its second operative positions), and deactivation of electrical supply (and, consequently, data communication) when the modules are unlocked from each other (that is, when the locking element is moved away from its second operative position toward its first operative position). Advantageously, the use in combination of the sliding element and the switch insures that the electrical supply of the modules and data communication between the modules can occur only when the modules are stably and correctly connected.

According to a first embodiment thereof, the apparatus of the present invention further comprises a first processor housed into said first device, a second processor housed into said at least one second device and a data transmitting/receiving line between said first and said second processors.

Preferably, said first processor is a microprocessor, said second processor is a microcontroller and said data transmitting/receiving line is a serial connection line. In this first embodiment, data communication between the first device and the at least one second device is enabled only upon condition that an appropriate sequence of data is exchanged on the serial connection line, to the effect that the at least one second device is recognized by the first device as being authorized to data communication.

According to a second embodiment thereof, the apparatus of the present invention further comprises a first processor housed into said first device and a contactless data transmitting/receiving device between said first processor and said at least one second device.

Preferably, said first processor is a network processor and said contactless data transmitting/receiving device comprises a reader chip housed into said first device and a memory chip housed into said at least one second device. In this second embodiment, data communication between the first device and the at least one second device is enabled only upon condition that an appropriate sequence of data is exchanged between the reader chip and the memory chip, to the effect that the at least one second device is recognized by the first device as being authorized to data communication.

In a second aspect thereof, the present invention relates to a method for communicating data between a distribution network and a residential network, comprising the steps of:
  interfacing a distribution network by a first device;
  interfacing a residential network by at least one second device;
  electrically and mechanically connecting said first device to said at least one second device;
characterized in that the method further comprises the step of locking said first device and said at least one second device to each other and activating the electrical supply between said first device and said at least one second device by means of an interconnecting device.

This method allows to achieve all the advantages discussed above with respect to the modular apparatus of the invention.

Preferably, the step of locking said first device and at least one second device to each other and activating the electrical supply between said first device and said at least one second device comprises the steps of:
  moving at least one locking element from a first operative position wherein said first and at least one second devices are unlocked and disconnectable from each other and the electrical supply (and, hence, data communication) between said first and at least one second devices is deactivated, to a second operative position wherein said first and at least one second devices are locked and not disconnectable from each other and the electrical supply between said first and at least one second devices is activated.

Preferably, the step of moving said locking element from said first operative position to said second operative position comprises the step of switching on, when the locking element is at said second operative position, a switch which in turn activates the electrical supply between said first and at least one second devices.

Preferably, the step of switching on said switch further comprises the steps of:
  activating the electrical supply between said first device and said at least one second device;
  testing said at least one second device for identification thereof by means of the first device and:
    if said test gives a positive result, enabling the data communication between said first and at least one second devices;
    if said test gives a negative result, disabling the data communication between said first and at least one second devices.

Advantageously, the data communication is enabled only if the expansion module is identified as a functionally compatible expansion module, thus preventing the risk of possible damages for the networks, the devices of the apparatus and the residential appliances.

In a third aspect thereof, the present invention relates to a local communication network allowing to interconnect residential appliances, comprising a modular apparatus as described above.

BRIEF DESCRIPTION OF THE DRAWINGS

Further characteristics and advantages of the present invention will become clearer from the following detailed description of a preferred embodiment thereof, made with reference to the attached drawings. In such drawings.

DETAILED DESCRIPTION OF THE INVENTION

These figures shown a preferred embodiment of the apparatus of the present invention. However, the invention is not restricted to the physical shape shown and other shapes or forms are possible without affecting either the basic operation of the apparatus of the invention and the novel teachings and advantages thereof.

Figure 1:
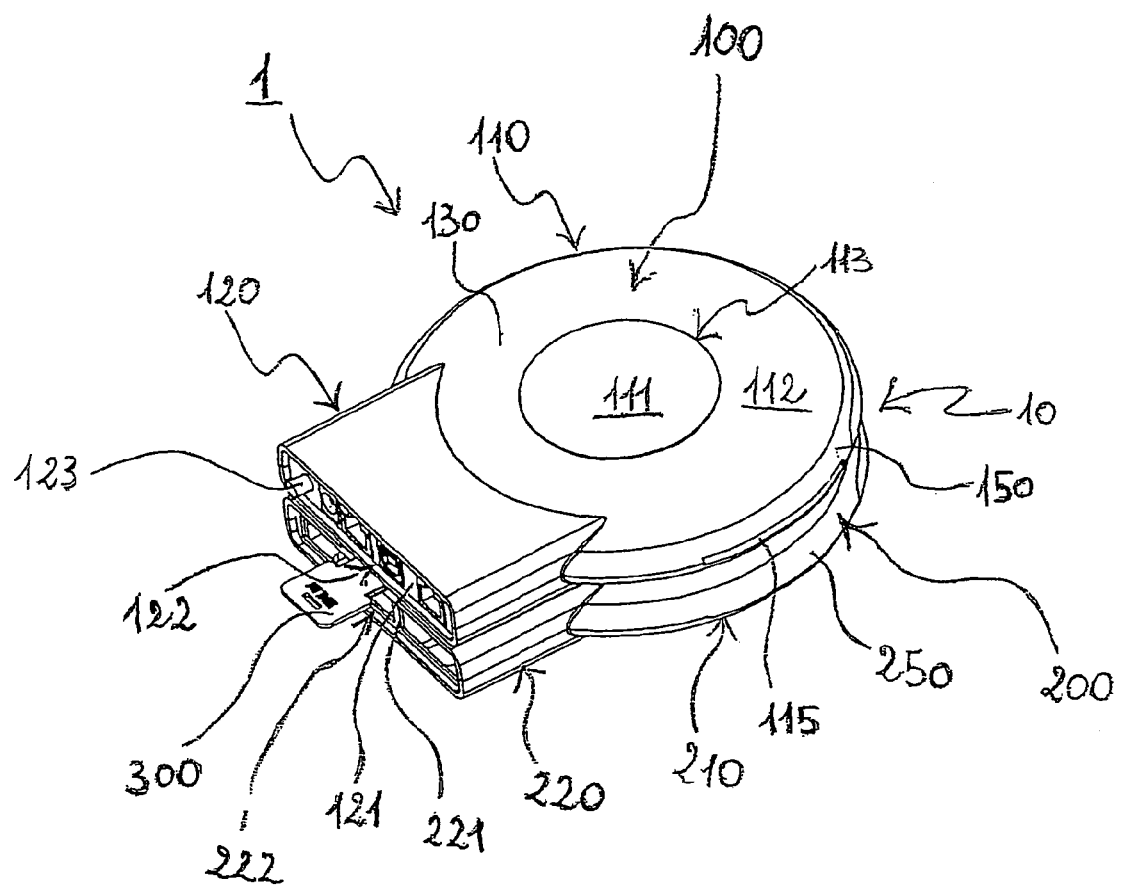
FIG. 1 is a perspective view of a modular apparatus according to the present invention.

In FIG. 1, a modular apparatus (or gateway) for allowing bi-directional data communication between a distribution network and a residential network is indicated with reference numeral 1. More generally, apparatus 1 allows data communication between a plurality of heterogeneous communication networks.

Apparatus 1 is adapted to be located in a residential setting, but it is suitable to be located in business settings too. Apparatus 1 provides for a bridging (or routing, or gateway) function between an external network (such as a WAN) and one or more in-home networks (such as a LAN), thus allowing bi-directional data distribution between the external network and different kinds of residential or business appliances, such as computers, printers, faxes, photocopying machines, television sets, telephones, etc.

As shown in FIG. 1, apparatus 1 comprises a first device (or base module) 100 adapted to interface the distribution network (for example by ADSL or optical technology) and a second device (or first expansion module) 200 adapted to interface the residential network. The first and second devices are mechanically and electrically connected to each other and together form a stack 10. The first and second device communicate data reciprocally and with the distribution network and the residential network, respectively, using any of a variety of communication protocols.

The first device 100 is preferably further adapted to be connected to the residential network so that, if a simple connection (e.g., a single link) is needed to transmit data to the appliances of the residential setting, the apparatus 1 can consist of a single module, i.e., only the first device 100.

The second device can be further adapted to interface a second distribution network, either of the same type or, preferably, of a different type from the distribution network interfaced by the first device, so as to provide an additional or alternative link of the residential network (or networks) to external networks.

In operation the stack 10 may be placed horizontally or, preferably, vertically. The devices 100 and 200 within the stack may be placed in any order. Preferably, in case of vertical stack, the first device 100 is placed at the top of the stack and the second device 200 (and any other possible further expansion module, not shown) is placed below the first device 100, as shown in FIG. 1.

Only for brevity and clarity reasons, the following description will be made with respect to the apparatus 1 of the invention in a vertical stack configuration, unless it is expressly mentioned the contrary.

In an embodiment of the invention, a base element (not shown) is placed at the bottom of the stack 10 to support and hold the stack 10 over a table or the floor. In an alternative embodiment, the stack 10 may be hung on a wall: in particular, in case of vertical stack, the base element may comprise a vertical plate adapted to be hung on the wall and a horizontal plate adapted to support the stack, whereas in case of horizontal stack, the expansion module placed at the bottom of the stack may be provided with a plate for hanging the stack to the wall. In a further embodiment, the vertical stack of modules may be supported and rest directly on a table or other supporting surface without interposition of a base element.

The modules 100 and 200 are flat in shape in order to be easily associated in a stack. They are preferably made of plastic material, for example of acrylonitrile butadiene styrene (ABS) filled with polycarbonate.

While the following description will be made with respect to a modular apparatus 1 comprising just two devices, namely the base module 100 and the first expansion module 200, it will be clear to the skilled person in the art that the same considerations will fully apply to modular apparatuses comprising more than two devices, namely a base module and more that one expansion module. In fact, the external structural configuration of the various expansion modules is identical for the parts associated with connectivity with the other modules, said expansion modules being different from each other only with respect to the internal configuration and/or to the communication protocol used to interface different appliances or residential networks. Therefore, what said with respect to the expansion module 200 is fully applicable to any other expansion module intended to be used in the apparatus 1 of the invention. For example, a second expansion module will be connected to the first expansion module 200 in the same way (and by means of the same elements) as the first expansion module 200 is connected to the base module 100.

Figure 2:
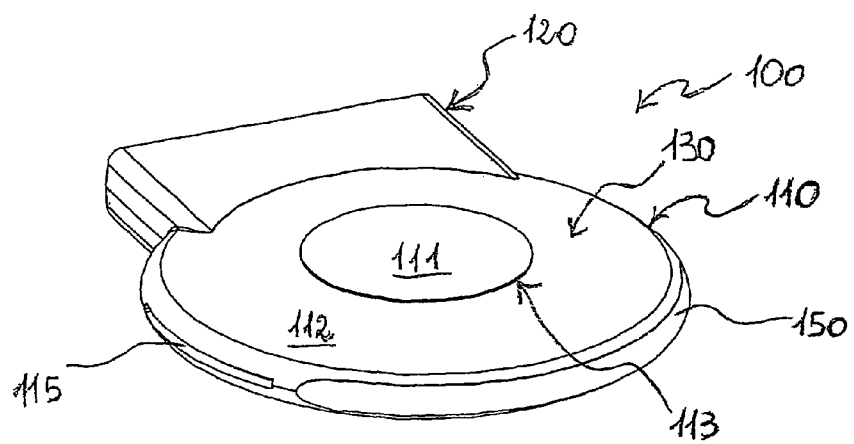
FIG. 2 is a perspective top view of a first device of the modular apparatus of FIG. 1.
Figure 3:
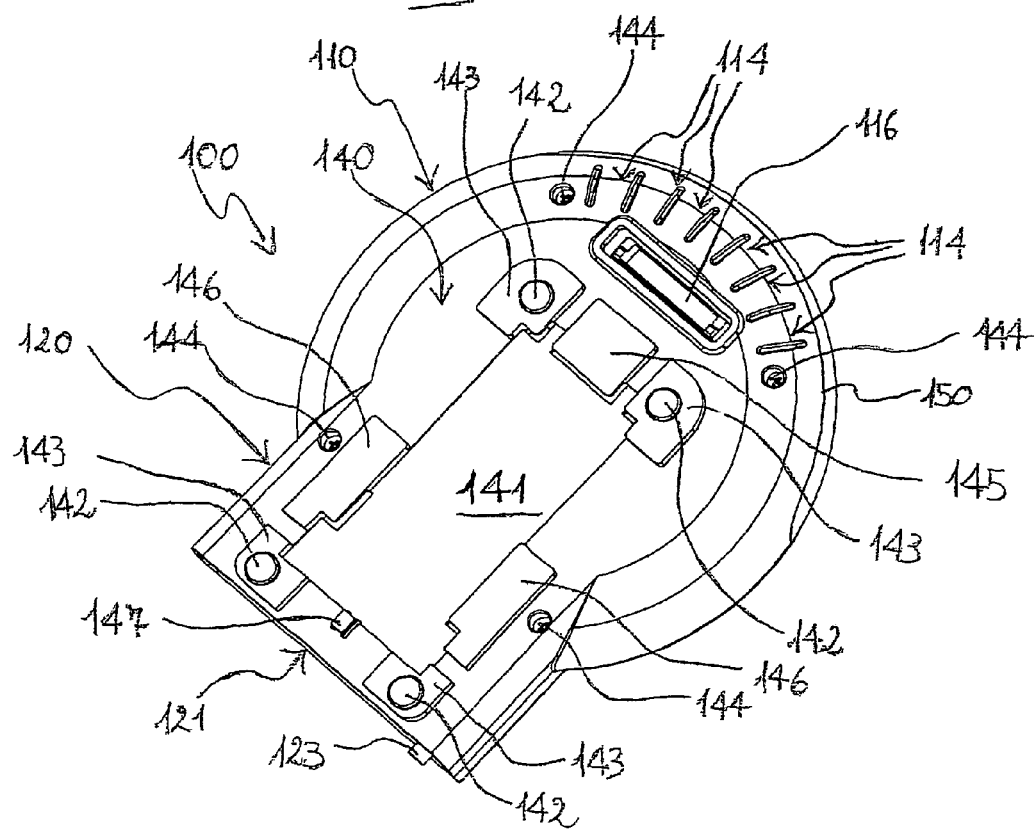
FIG. 3 is a perspective bottom view of the device of FIG. 2.

As shown in FIGS. 1, 2 and 3, the base module 100 comprises a first portion 110 which is circular-like in shape and a second portion 120 which is quadrangular-like in shape. The base module 100 further comprises an upper surface 130 (shown in FIGS. 1 and 2), a bottom surface 140 (shown in FIG. 3) and a side surface 150.

The first portion 110 of the base module 100 comprises, at the upper surface 130, a central portion 111 which is slightly lifted up with respect to the surrounding portion 112 in order to create a circular opening 113 for allowing ventilation of the electronic and or optical devices provided into the base module 100. The first portion 110 of the base module 100 further comprises, at the bottom surface 140, a plurality of vent slots (all indicated with 114 in FIG. 3) which contribute to the ventilation within the base module 100.

A slot 115 for housing a card, e.g. a smart card, (not shown) for enabling data communication between the base module 100 and the distribution network is formed on the side surface 150 of the base module 100 (see FIGS. 1 and 2).

A connector 116 is provided on the bottom surface 140 of the base module 100, at an end of the first portion 110 thereof, for allowing electrical connection and data communication between the base module 100 and the first expansion module 200, as it will be better explained in the following.

The second portion 120 comprises a frontal surface 121 (shown in FIGS. 1 and 3) provided with a plurality of connectors and ports (all indicated with 122 in FIG. 1 and not visible in FIGS. 2 and 3) for allowing electrical connections and data communication between the base module 100 and the distribution network and/or between the base module 100 and a first residential network or first residential appliances. A switch 123 is provided on the frontal surface 121 to allow functional activation of the base module 100.

As shown in FIG. 3, the bottom surface 140 further comprises a portion 141 for allowing mechanical connection between the base module 100 and the first expansion module 200. Around the portion 141, four projecting legs 142 are provided for placing the base module 100 on the first expansion module 200 when these module are stacked together. Respective projecting bases 143 are provided for each leg 142, These projecting bases 143 are intended to be housed into corresponding recess seats 233 (see FIG. 4) provided on the first expansion module 200 for assisting correct alignment of the base module 100 over the first expansion module 200 when these modules are stacked together. Four holes 144 are further provided at the bottom surface 140 of the base module 100 for housing corresponding pins 234 (see FIG. 4), provided on the first expansion module 200, thus contributing to the alignment of these modules when stacked together. An undercut projecting seat 145 is provided at one end of portion 141 and an undercut pin 147 is provided at the opposite end of portion 141 for firmly securing the base module 100 to the first expansion module 200 as better explained in the following. The undercut projecting seat 145 is intended to be housed into a corresponding recess seat 235 (see FIG. 4) provided on the first expansion module 200. Two projecting surfaces 146 are provided on the opposite side to the portion 141 for contributing to the mechanical connection between the base module 100 and the first expansion module 200. The projecting surfaces 146 are intended to the housed into corresponding recess seats 236 (see FIG. 4) provided on the first expansion module 200.

The portion 141 for allowing mechanical connection between the base module 100 and the first expansion module 200 is therefore defined by: the four projecting bases 143, the undercut projecting seat 145, the two projecting surfaces 146 and the undercut pin 147.

A microswitch (not shown) is provided into the base module 100 for activating electrical supply (and, hence, data communication) between the base module 100 and the first expansion device 200 only when a stable and correct mechanical connection between these module is achieved. The microswitch is located at the bottom surface 140, preferably at the undercut projecting seat 145, and is switched on/off as better explained in the following.

Figure 4:
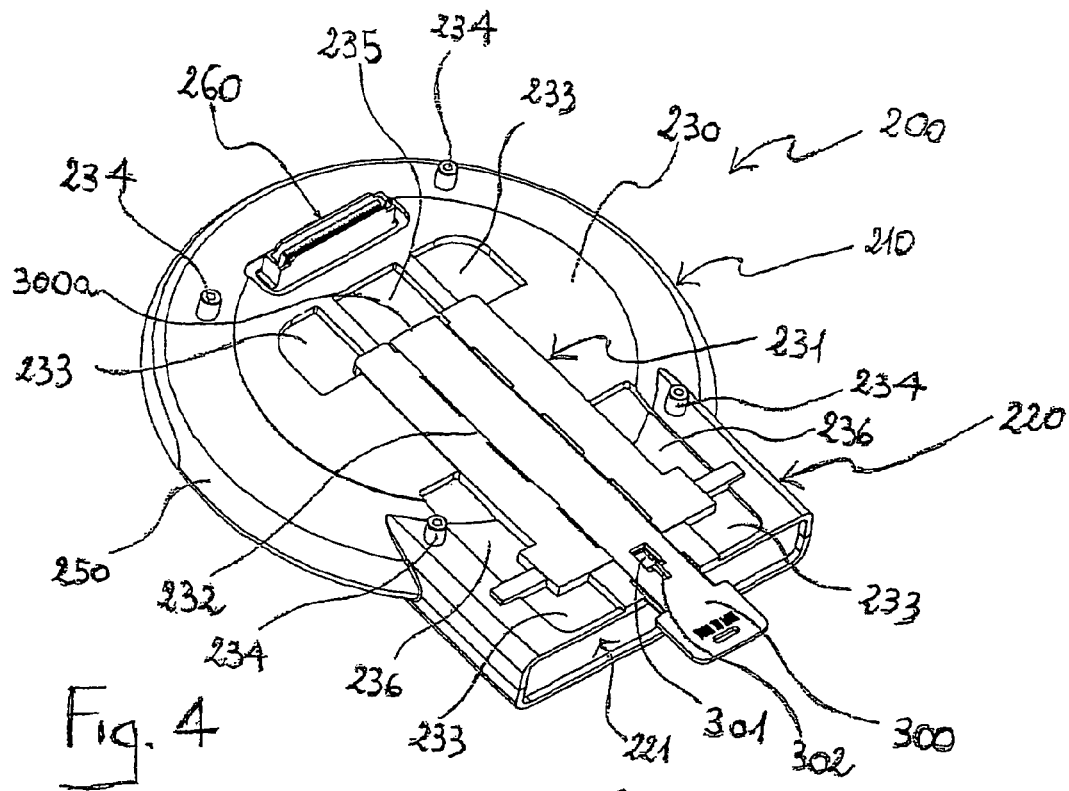
FIG. 4 is a perspective top view of a second device of the modular apparatus of FIG. 1.
Figure 5:
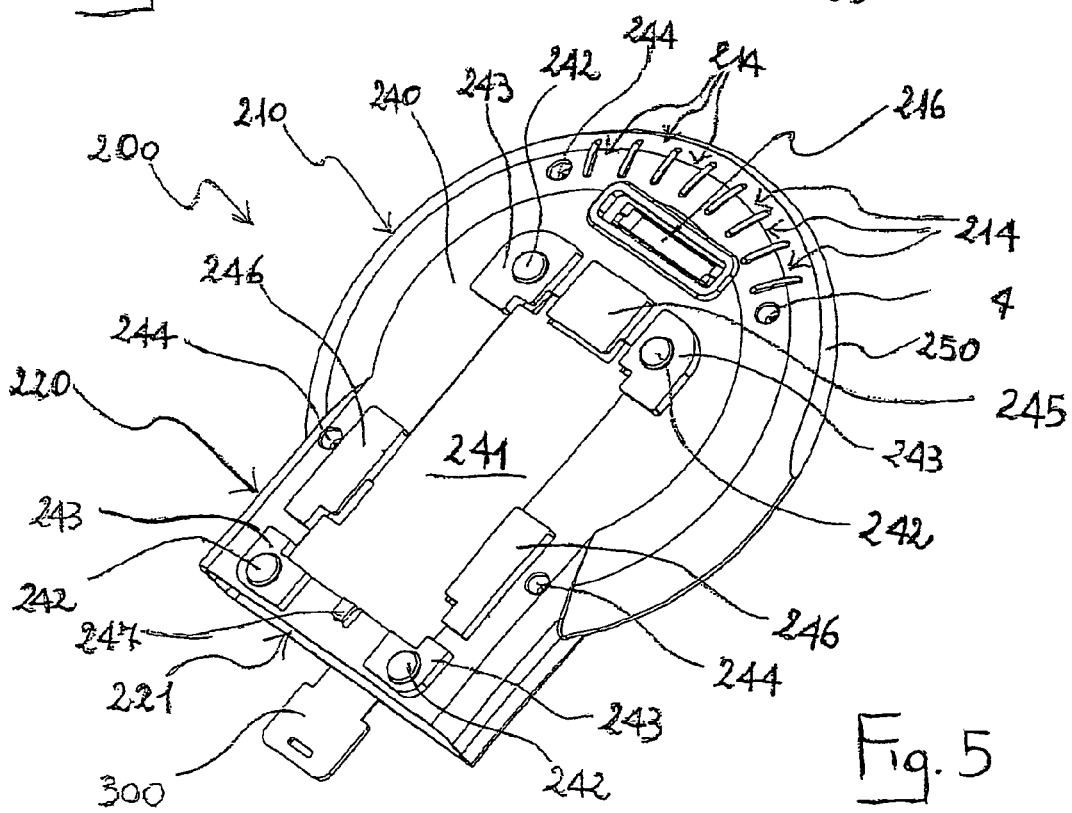
FIG. 5 is a perspective bottom view of the device of FIG. 4.

As shown in FIGS. 1, 4 and 5, the first expansion module 200 comprises a first portion 210 which is circular-like in shape (having same dimension and shape of the first portion 110 of the base module 100) and a second portion 220 which is quadrangular-like in shape (having same dimension and shape of the second portion 120 of the base module 100). The first expansion module 200 further comprises an upper surface 230 (shown in FIGS. 1 and 4), a bottom surface 240 (shown in FIG. 5) and a side surface 250.

The bottom surface 240 is structurally and functionally identical to the bottom surface 140 of the base module 100. Moreover, the bottom surface 240 preferably comprises a plurality of vent slots (all indicated with 214 in FIG. 5 and having the same locations of vent slots 114 on the bottom surface 140 of the base module 100) for allowing ventilation within the first expansion module 200.

The bottom surface 240 further comprises a portion 241 intended for allowing mechanical connection between the first expansion module 200 and a second expansion module (not shown) in the same way as the base module 100 is mechanically connected to the first expansion module 200. Around the portion 241, four projecting legs 242, each provided on a respective projecting base 243, and four holes 244 are provided for assisting correct alignment of the first expansion module 200 over a possible additional expansion module, when these modules are stacked. An undercut projecting seat 245 is provided at one end of portion 241 and an undercut pin 247 is provided at the opposite end of the portion 241 for firmly securing the first expansion module 200 to an additional expansion module in the same way as the first expansion module 200 is firmly secured to the base module 100. Two projecting surfaces 246 are provided on the opposite side to the portion 241 for contributing to the mechanical connection between the first expansion module 200 and a possible additional module. The portion 241 for allowing mechanical connection between the first expansion module 200 and a possible additional module is therefore defined by: the four projecting bases 243, the undercut projecting seat 245, the two projecting surfaces 246 and the undercut pin 247.

A connector 216 is further provided on the bottom surface 240 of the first expansion module 200, at one end of the first portion 210 thereof, for allowing electrical connection and data communication between the first expansion module 200 and a possible additional expansion module, in the same way as the base module 100 is electrically connected to the first expansion module 200.

A microswitch (not shown) is provided into the first expansion module 200 for activating the electrical power supply from the first expansion module 200 to a possible additional module only when a stable and correct mechanical connection between these module is achieved. The microswitch is located at the bottom surface 240, preferably at the undercut projecting seat 245, and is switched on/off in the same way as the microswitch of the base module 100.

The modules are adapted to being electrically supplied by an electrical supply device coupled to the base module, via a supply line implemented in the connectors that provide electrical coupling between the modules. Preferably an unregulated power supply device is coupled to the base module. The base module and each expansion module are provided with suitable stabilizing electronics to extract one or more stable supply voltages, as needed in each module, from the unregulated power supply. The microswitch of each specific expansion module is adapted to interrupt the supply line at the entrance of that module, so that until the microswitch remains open the power supply coming from the supply line in the input connector is not fed to the electronic equipment in the module itself nor to output connector, i.e. to the following expansion module or modules.

The second portion 220 of the first expansion module 200 comprises a frontal surface 221 (shown in FIGS. 1, 4 and 5) provided with a plurality of connectors and ports (all indicated with 222 in FIG. 1 and not shown in FIGS. 4 and 5) for allowing electrical connections and data communication between the first expansion module 100 and a second residential network or second residential appliances, and/or between the first expansion module 100 and a distribution network.

The upper surface 230 comprises a projecting plate 231 for allowing mechanical connection between the first expansion module 200 and the base module 100. This plate 231 is adapted to cooperate with portion 141 of the base module 100 for mechanically associating and firmly securing the first expansion module 200 to the base module 100, as it will be better explained in the following. Around plate 231, the above mentioned recess seats 233, 235, 236 are respectively provided for housing the above mentioned projecting bases 143, undercut projecting seat 145 and projecting surfaces 146, when the modules are stacked. Also, the above mentioned four pins 234 intended to be housed into the holes 144 of the base module 100 are provided on the upper surface 230.

Plate 231 comprises a longitudinal undercut seat 232 housing an elongate element 300. Element 300 is held within the seat 232 by the undercut portion thereof and is only capable of sliding within seat 232 between a first operative position (shown in FIGS. 1 and 4) and an opposite second operative position (not shown), wherein this element is pushed ahead. Element 300 acts as a locking element to firmly secure base module 100 and first expansion module 200 each to the other when they are stacked and mechanically connected. A hole 301 is formed on the locking element 300. Hole 301 comprises a narrower end portion 302 adapted to tightly house undercut pin 147 when the base module 100 is stacked on the first expansion module 200 and the locking element 300 is at its second operative position.

A connector 260 is provided on the upper surface 230 of the first expansion module 200, at the first portion 210 thereof, for allowing electrical connection and data communication between the first expansion module 200 and base module 100, as it will be better explained in the following. Connector 260 of the expansion module 200 is intended to mate and cooperate with connector 116 of the base module 100.

The locking element 300 defines, in cooperation with the undercut projecting seat 150 and undercut pin 147 of the base module 100, an interconnecting device which, being operatively interposed between the base module 100 and the first expansion module 200, locks these modules each to the other, thus keeping a stable and correct mechanical and electrical connection between these modules over time.

The mechanical connection between the base module 100 and the first expansion module 200 (and, consistently, between the first expansion module 200 and any further additional expansion module, and so on) is effected by facing the bottom surface 140 of the base module 100 against the upper surface 230 of the first expansion module 200 and associating these module by housing, respectively, the pins 234 of the first expansion module 200 into the holes 144 of the base module, the projecting bases 143, undercut seat 145 and surfaces 146 of the base module 100 into the recess seats 233, 235, 236 of the first expansion module 200, and the undercut pin 147 of the base module 100 into the hole 301 of the locking element 300 (which is at its first operative position). At the same time connector 116 mates with connector 260. In this operative configuration the modules 100 and 200 are mechanically and electrically connected to each other, but they are still disconnectable and the electrical connection and data communication between these modules is still disabled.

By pushing ahead the locking element 300 toward its second operative position, a free end 300a of the sliding element 300 is housed within the undercut projecting seat 145 of the base module 100 and the undercut pin 147 slides into the narrower end portion 302 of the hole 301 thus locking the first expansion module 200 to the base module 100 by firmly securing the pin 147 into the hole end portion 302 of the locking element 300 and the end portion 300a of the locking element 300 into the projecting undercut seat 145 of the base module 100. In this operative configuration, the modules 100 and 200 are locked to each other.

The electrical connection and data communication between the base module 100 and the expansion module 200 (and, consistently, between the first expansion module 200 and any further additional expansion module, and so on) occurs through connectors 116 and 260, which are mated when the modules are stacked. However, the electrical supply (and, hence, data communication) is activated only when the microswitch provided on the base module 100 is switched on by the end portion 300a of locking element 300, i.e. when locking element 300 is pushed ahead to its second operative position. When the locking element 300 is moved away from its second operative position toward its first operative position, the microswitch is switch off and the electrical supply between the base module 100 and the first expansion module 200 is deactivated.

Communication between the base module 100 and the expansion module 200 can be achieved by providing a processor (such as a microprocessor or microcontroller) (not shown) into the base modules of the apparatus 1. Specifically, the processor housed into the base module 100 can be a network processor which routes different data to different expansion module according to predetermined communication protocols via one or more appropriate communication buses.

According to a first embodiment of the apparatus 1 of the present invention, a serial connection line, such as ISO 7816-3, further connects a microprocessor in the base module 100 with microcontrollers of each expansion modules in a repeated master-slave chain configuration, that is a serial configuration wherein each module acts as a master for the following module and as a slave for the previous one. In this configuration, all the expansion modules are queried and tested by the base module to be identified and activated.

In an alternative version of the first embodiment, the serial communication line also includes address lines through which the microprocessor in the base module can address the microcontrollers in the expansion modules. For example, the single bi-directional serial communication line may be replaced by a serial communication signal line bus, such as an I2C bus, wherein the base module acts as a master and each expansion module acts as a slave, and a respective address is assigned to each expansion module; some, e.g. two, of the lines of the serial communication bus are for example used to assign the respective address to the expansion modules; an expansion module reads the address assigned thereto and generates, for example on an incremental basis, a new address to be assigned to the next expansion module which will be added.

The following course of action occurs in the above disclosed embodiment of the apparatus of this invention:
1. The modules (base module and any expansion module) are mechanically and electrically connected to each other and the locking element 300 is moved at its second operative position thus closing the contact in the microswitch;
2. The expansion module (or modules) is (are) electrically powered by the base module (i.e. the electrical supply is activated);
3. The base module, by means of its microprocessor (and the slave processors on the possible existing expansion modules) tests the expansion module(s) for identification thereof;
4. If the expansion module is identified, it is functionally activated (i.e. communication data is enabled); if not identified, the data communication between said modules is disabled.

According to a second embodiment of the apparatus 1 of the present invention, a contactless data transmitting/receiving device is used in place of the serial connection line. In this embodiment, the base module comprises a chip acting as controller/reader/writer (such as a CRX14 contactless coupler chip from STMicroelectronics) whereas the expansion modules comprises respective chips acting as memories (such as a SRIX4K contactless memory chip from STMicroelectronics).

In this embodiment, the processor of the base module communicates simultaneously, via the controller/reader/writer chip with memories of the expansion modules by a wireless system for identification thereof. The memory chips are powered from the reader chip by radiofrequency when the expansion modules are within a distance range of 10-20 cm from the base module. Therefore, the test for identification here can occur even when the expansion modules are not powered (i.e. even when the electrical supply between the modules is not activated).

Although exemplary embodiments and way of implementation of the invention have been described in detail above, those skilled in the art will readily appreciate that many additional modifications are possible in the exemplary embodiments without departing from the novel teachings and advantages of the invention.

The invention claimed is:
1. A modular apparatus for data communication between a distribution network and a residential network, comprising:
   a first device having a first connector firmly associated thereon, adapted to interface a distribution network;
   at least one second device having at least one second connector firmly associated thereon, adapted to interface a residential network and to be mechanically and electrically connected to said first device; and at least one interconnecting device adapted to lock said first device and said at least one second device to each other and to activate electrical supply between said first device and said at least one second device, said at least one interconnecting device defining a first operative configuration wherein said first and at least one second devices are unlocked so as to be disconnectable from each other and wherein the electrical supply between said modules is prevented, and a second operative configuration wherein said first and at least one second devices are locked so as to be not disconnectable from each other and wherein the electrical supply between said modules is activated, said at least one interconnecting device comprising a locking element which is slidable between a first operative position corresponding to said first operative configuration of the apparatus and a second operative position corresponding to said second operative configuration of the apparatus.

2. The modular apparatus according to claim 1, further comprising:

a first seat for said locking element formed on said first device; and a second seat for said locking element formed on said at least one second device, wherein said second seat slidably houses said locking element and said first seat is adapted to house a free end of said locking element when said locking element is at said second operative position.

3. The modular apparatus according to claim 2, further comprising a pin integrally formed with said first device and a hole formed into said locking element, wherein said hole slidably houses said pin and comprises a narrower end portion adapted to cooperate with said pin when said locking element is at said second operative position, thus securing said first device to said locking element.

4. The modular apparatus according to claim 1, further comprising a switch adapted to be switched on by said locking element when said locking element is at said second operative position thus activating the electrical supply between said first and at least one second devices, and to be switched off by said locking element when said locking element is moved away from said second operative position thus deactivating the electrical supply between said first and at least one second devices.

5. The modular apparatus according to claim 1, further comprising a first processor housed into said first device, a second processor housed into said at least one second device and a data transmitting/receiving line between said first and second processors.

6. The modular apparatus according to claim 5, wherein said first processor is a microprocessor, said second processor is a microcontroller and said data transmitting/receiving line is a serial connection line.

7. The modular apparatus according to claim 1, further comprising a first processor housed into said first device and a contactless data transmitting/receiving device between said first microprocessor and said at least one second device.

8. The modular apparatus according to claim 7, wherein said first processor is a network processor and said contactless data transmitting/receiving device comprises a reader chip housed into said first device and a memory chip housed into said at least one second device.

9. A method for communicating data between a distribution network and a residential network, comprising the steps of:

interfacing a distribution network by a first device having a first connector;

interfacing a residential network by at least one second device having at least one second connector;

electrically and mechanically connecting said first device to said at least one second device; and locking said first device and said at least one second device to each other and activating the electrical supply between said first device and said at least one second device by means of at least one interconnecting device, the step of locking said first device and at least one second device to each other and activating the electrical supply between said first device and said at least one second device comprising the steps of:

slidably moving at least one locking element from a first operative position wherein said first and at least one second devices are unlocked and disconnectable from each other, and the electrical supply between said first and at least one second devices is deactivated, to a second operative position wherein said first and at least one second devices are locked and not disconnectable from each other and the electrical supply between said first and at least one second devices is activated.

10. The method according to claim 9, wherein the step of slidably moving said locking element from said first operative position to said second operative position comprises the step of switching on, when the locking element is at said second operative position, a switch which in turn activates the electrical supply between said first and at least one second devices.

11. The method according to claim 10, wherein the step of switching on said switch further comprises the steps of:

activating the electrical supply between said first device and said at least one second device;

testing said at least one second device for identification thereof by means of the first device, and if said test gives a positive result, enabling the data communication between said first and at least one second devices; and if said test gives a negative result, disabling the data communication between said first and at least one second devices.

12. A local communication network which allows interconnection of residential appliances, comprising a modular apparatus according to any one of the claims from 1 to 8.

* * * * *